Patented Nov. 7, 1950

2,528,654

UNITED STATES PATENT OFFICE 2,528,654

1,2 - DIHYDROXY - 4,5,6,7,8,8 - HEXAHALO - 4,7 - METHANO - 3a,4,7,7a - TETRAHYDRO-INDANE AND METHOD OF PREPARING SAME

Simon H. Herzfeld and Morton Kleiman, Chicago, Ill., assignors to Velsicol Corporation, Chicago, Ill., a corporation of Illinois No Drawing. Application July 22, 1948, Serial No. 40,153

7 Claims. (Cl. 260—617)

This invention relates to a new composition of matter and to a method of production thereof.

More specifically, this invention relates to the preparation of a material having the structural formula:

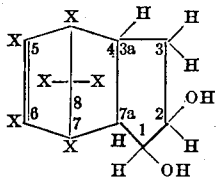

wherein X is a halogen of the group consisting of chlorine, bromine and mixtures thereof.

According to "The Ring Index" by Patterson and Capell, A. C. S. Monograph Series, No. 84, 1940, dicyclopentadiene, $C_{10}H_{12}$, is described as 4,7 - methano-3a,4,7,7a - tetrahydroindene. Following this accepted system of nomenclature, the compound above represented by structural formula can be described (assuming the halogen atoms are all chlorine) as 1,2-dihydroxy-4,5,6,-7,8,8-hexachloro-4,7-methano-3a,4,7,7a - tetrahydroindane.

Briefly, the process herein disclosed involves the oxidation of the cyclopentene ring in the Diels-Alder adduct of hexahalocyclopentadiene and cyclopentadiene (4,5,6,7,8,8-hexahalo-4,7 - methano-3a,4,7,7a-tetrahydroindene) to ultimately result in the glycol above represented by structural formula. The reaction, starting with the materials hexahalocyclopentadiene and cyclopentadiene may be represented as follows:

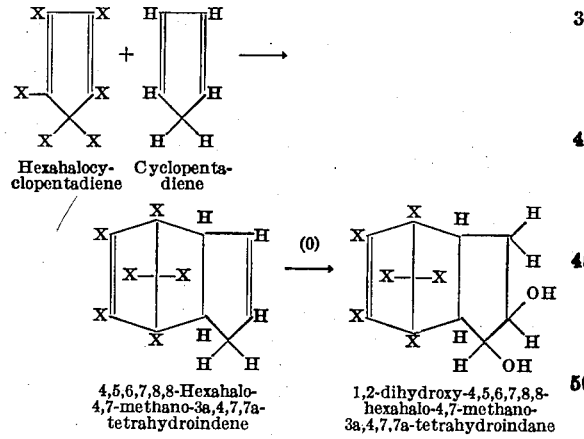

4,5,6,7,8,8-Hexahalo-4,7-methano-3a,4,7,7a-tetrahydroindene 1,2-dihydroxy-4,5,6,7,8,8-hexahalo-4,7-methano-3a,4,7,7a-tetrahydroindane The Diels-Alder adduct of a hexahalocyclopentadiene and cyclopentadiene, the structure and name of which have been previously mentioned, and the method for making same has been disclosed and claimed in the co-pending application of Herzfeld, Lidov and Bluestone, Serial No. 639,416, filed January 5, 1946.

For the purpose of clarity and brevity only the Diels-Alder adduct of hexachlorocyclopentadiene and cyclopentadiene will be hereinafter referred to, although it is expressly understood that the adduct formed from hexabromocyclopentadiene or a mixed hexachloro-bromocyclopentadiene is fully applicable to the process of this invention. Further, the above mentioned adduct of hexachlorocyclopentadiene and cyclopentadiene will hereinafter be referred to as chlordene.

The oxidation of chlordene to the glycol may be effected, for example, by treating chlordene with an organic peracid such as, perbenzoic, peracetic, or mono-perphthalic acid, and hydrolyzing the resultant oxidized product by means well known to the art. If the oxidation is carried out in the presence of water, subsequent hydrolysis to form the glycol may be unnecessary. A specific example of such oxidation, followed by alcoholysis, to form the glycol derivative of chlordene is hereinafter noted for the purpose of illustration.

As a non-fully equivalent alternative, the oxidation of chlordene to the glycol may be effected by the use of such reagents as (1) cold, dilute, neutral, aqueous permanganate, (2) hydrogen peroxide and acetic acid, or (3) sodium chlorate in aqueous solution containing osmium tetroxide, all followed, where necessary, by hydrolysis to form the desired glycol.

The necessity for treatment of the oxidized chlordene to result in the glycol is apparent if the mechanism of oxidation be considered. Thus, oxidation, for example, with cold neutral aqueous permanganate results in a glycol as the first product and hence further treatment such as hydrolysis is unnecessary. However, the use of organic peracids will generally result in the formation of the oxide

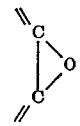

which must be hydrolyzed to result in the glycol. Such hydrolysis is known to the art and can be accomplished in the ordinary way as, for example, by heating said oxide with an aqueous or aqueous-alcoholic solution of an alkali such as sodium hydroxide or potassium hydroxide. Alternatively, hydrolysis may be accomplished by heating the adduct in an aqueous acid such as aqueous sulfuric, hydrochloric or para-toluene sulfonic acid. The mechanism of this reaction may be illustrated as follows:

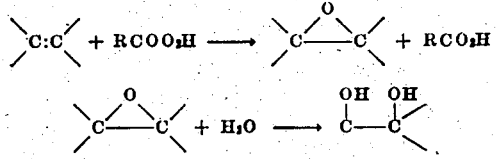

Oxidation with organic peracids may result in mono-ester or diester derivatives of the glycol instead of the oxide. Such ester derivatives may also be hydrolyzed by the same means that the oxide is converted to the glycol and thus it is not material as to which intermediate product is formed. If the ester derivatives of chlordene arise, conversion to the glycol may also be effected by alcoholysis, or, as it is sometimes referred to, by the ester-interchange reaction. Alcoholysis may be accomplished in the conventional manner, for example, by treating the ester derivatives with an excess of an alcohol, preferably of a low molecular weight, such as methanol, ethanol, propanol, or ethylene glycol, which may act both as diluent and reactant, in the presence of a proper catalyst such as sulfuric or hydrochloric acid, or such basic compounds as sodium methoxide and sodium acetate. As previously stated under certain aqueous oxidation conditions, hydrolysis occurs during the oxidation step and thus, subsequent hydrolysis, although not harmful, is unnecessary. It will be noted that in the specific example subsequently cited, the di-ester derivative of chlordene was obtained by oxidation with an organic per-acid. In the specific example the conversion to the glycol was accomplished by alcoholysis.

*Preparation of 1,2-dihydroxy-4,5,6,7,8,8-hexachloro-4,7-methano-3a,4,7,7a-tetrahydroindane*

A solution of 0.3 mol (102 g.) of chlordene, 0.6 mol (114 g.) of 40% peracetic acid, 100 ml. acetic anhydride and 350 ml. of acetic acid was kept at 45° C. for 44 hours. The solvent was removed in vacuo and the residue was dissolved in benzene and then extracted with aqueous sodium bisulfite to remove the last traces of the oxidizing agent. The benzene solution was dried over magnesium sulfate and concentrated by evaporation. Hexane was added and the diacetoxy derivative of chlordene crystallized from the mixture on standing.

A solution of 60 g. of diacetoxychlordene, 600 ml. methanol, and 3 ml. concentrated hydrochloric acid was heated under reflux for 20 hours. The alcohol was then removed by distillation and the residue was poured into cold water. The solid product was recovered by filtration and washed with water. The purified material, a white crystalline solid melting at 139-140° C. was identified as the dihydroxy derivative of the Diels-Alder adduct of hexachlorocyclopentadiene and cyclopentadiene.

The new product of the present invention is valuable for use in the control and destruction of insects. The product of this invention is also useful as an intermediate in the preparation of other insecticidal compositions derived from the present parent compound by further halogenation and/or replacement of hydroxyl groups with chlorine atoms. Highly halogenated derivatives of the adduct herein concerned may be prepared which have such uses as impregnants, fireproofing agents, etc.

We claim as our invention:

1. A new composition of matter having the structural formula

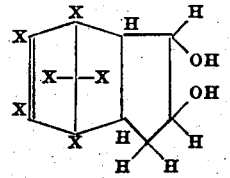

wherein X is a halogen of the group consisting of chlorine, bromine and mixtures thereof.

2. A new composition of matter having the structural formula

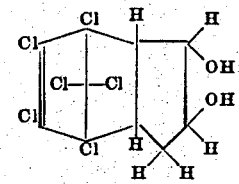

3. The method of forming 1,2-dihydroxy-4,5,6,7,8,8-hexahalo-4,7-methano-3a,4,7,7a-tetrahydroindane wherein the halogen atoms are of the group chlorine, bromine and mixtures thereof which comprises oxidizing the cyclopentene ring containing carbon atoms 1, 2, 3, 3a and 7a of 4, 5, 6, 7, 8, 8-hexahalo-4, 7-methano-3a, 4, 7, 7a-tetrahydroindene, with an organic peracid and hydrolyzing the thus oxidized material.

4. The method of claim 3 where the 4,5,6,7,8,8-hexahalo-4,7- methano - 3a,4,7,7a - tetrahydroindene is 4,5,6,7,8,8-hexachloro-4,7-methano-3a,4,-7,7a-tetrahydroindene.

5. The method of claim 3 where the organic peracid is peracetic acid.

6. The method of claim 3 where the organic peracid is perbenzoic acid.

7. The method of forming a new composition of matter which comprises oxidizing the cyclopentene ring of 4,5,6,7,8,8-hexahalo-4,7-methano-3a,4,7,7a-tetrahydroindene with an organic peracid under essentially non-aqueous conditions in the presence of an organic acid, and subjecting the thus oxidized material to alcoholysis.

SIMON H. HERZFELD.
MORTON KLEIMAN.

REFERENCES CITED

The following references are of record in the file of this patent:

UNITED STATES PATENTS

| Number | Name | Date |
| --- | --- | --- |
| 2,135,271 | Balcar | Nov. 1, 1938 |
| 2,312,535 | Fieser | Mar. 2, 1943 |
| 2,367,169 | Gardner | Jan. 9, 1945 |
| 2,458,484 | Terry et al. | Jan. 4, 1949 |

OTHER REFERENCES

Arbuzov et al., abstracts in Chem. Ab., vol. 24, col. 4285-6 (1930), (2 pages).

Certificate of Correction

Patent No. 2,528,654                                              November 7, 1950

SIMON H. HERZFELD ET AL.

It is hereby certified that error appears in the printed specification of the above numbered patent requiring correction as follows:

Column 2, line 15, for the word "chlorine" read *chlordene*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*